(12) United States Patent
Lee et al.

(10) Patent No.: US 9,972,439 B2
(45) Date of Patent: May 15, 2018

(54) CERAMIC ELECTRONIC COMPONENT AND METHOD OF MANUFACTURING THE SAME

(71) Applicant: SAMSUNG ELECTRO-MECHANICS CO., LTD., Suwon-Si, Gyeonggi-Do (KR)

(72) Inventors: Kyoung No Lee, Suwon-Si (KR); Kyu Ha Lee, Suwon-Si (KR); Seung Hee Yoo, Suwon-Si (KR); Eun Joo Choi, Suwon-Si (KR); Jun Hyeong Kim, Suwon-Si (KR); Byung Jun Jeon, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 99 days.

(21) Appl. No.: 14/920,753

(22) Filed: Oct. 22, 2015

(65) Prior Publication Data
US 2016/0254094 A1    Sep. 1, 2016

(30) Foreign Application Priority Data
Feb. 26, 2015    (KR) .................. 10-2015-0027191

(51) Int. Cl.
*H01G 4/30* (2006.01)
*H01G 4/232* (2006.01)
*H01G 4/12* (2006.01)

(52) U.S. Cl.
CPC ............. *H01G 4/30* (2013.01); *H01G 4/2325* (2013.01); *H01G 4/12* (2013.01)

(58) Field of Classification Search
None
See application file for complete search history.

(56) References Cited

U.S. PATENT DOCUMENTS

| 8,988,854 | B1* | 3/2015 | Zenzai | H01G 4/30 361/301.4 |
| 2008/0073108 | A1* | 3/2008 | Saito | H01G 4/2325 174/256 |
| 2013/0082575 | A1 | 4/2013 | Kang et al. | |
| 2014/0043724 | A1* | 2/2014 | Kang | H01G 4/30 361/321.2 |
| 2014/0211368 | A1* | 7/2014 | Fujii | H01G 4/012 361/301.4 |
| 2015/0022940 | A1* | 1/2015 | Han | H01G 4/30 361/301.4 |
| 2015/0170786 | A1* | 6/2015 | Hong | H01B 1/02 174/260 |
| 2015/0279566 | A1* | 10/2015 | Otani | H01G 4/30 361/301.4 |

(Continued)

FOREIGN PATENT DOCUMENTS

| JP | 2002-203736 A | 7/2002 |
| JP | 2012-004189 A | 1/2012 |
| KR | 10-2013-0036596 A | 4/2013 |

*Primary Examiner* — Dion R Ferguson
(74) *Attorney, Agent, or Firm* — McDermott Will & Emery LLP

(57) ABSTRACT

A ceramic electronic component includes a ceramic body; internal electrodes disposed in the ceramic body; external electrodes disposed on outer surfaces of the ceramic body and electrically connected to the internal electrodes; and tin plating layers disposed on the external electrodes.

10 Claims, 4 Drawing Sheets

(56) References Cited

U.S. PATENT DOCUMENTS

| | | | |
|---|---|---|---|
| 2015/0318111 A1* | 11/2015 | Lee ........................ | H01G 4/12 361/301.4 |
| 2016/0087189 A1* | 3/2016 | Lee ........................ | H01G 4/30 310/365 |

* cited by examiner

CERAMIC ELECTRONIC COMPONENT AND METHOD OF MANUFACTURING THE SAME

CROSS-REFERENCE TO RELATED APPLICATION

This application claims the benefit of priority to Korean Patent Application No. 10-2015-0027191, filed on Feb. 26, 2015 with the Korean Intellectual Property Office, the entirety of which is incorporated herein by reference.

BACKGROUND

The present disclosure relates to an electronic component, and more particularly, to a ceramic electronic component formed of ceramic material, and a method of manufacturing the same.

In general, electronic components using ceramic material such as capacitors, inductors, piezoelectric elements, varistors, and thermistors include a ceramic body formed of ceramic material, internal electrodes provided inside the ceramic body, and external electrodes installed on the surface of the ceramic body to be connected to the internal electrodes.

Among such ceramic electronic components, multilayer ceramic capacitors include a plurality of laminated dielectric layers, internal electrodes disposed to face each other with a dielectric layer interposed therebetween, and external electrodes electrically connected to the internal electrodes.

Multilayer ceramic capacitors are a widely-used component in mobile communications devices such as computers, personal digital assistants (PDAs), and mobile phones, due to their small size, high capacitance, and ease of mounting. As electronic products have become more compact and multi-functional, electronic components have also tended to become more compact and highly functional. Following this trend, a multilayer ceramic capacitor having a small size and high capacitance is required.

As for a general method of manufacturing the multilayer ceramic capacitor, ceramic green sheets are manufactured and a conductive paste is printed on the ceramic green sheets to thereby form internal electrode layers. Tens to hundreds of such ceramic green sheets, provided with the internal electrode layers, are then laminated to produce a green ceramic laminate. Thereafter, the green ceramic laminate is compressed at a high temperature and pressure to form a hard green ceramic laminate, and the hard green ceramic laminate is cut to manufacture a green chip. Then, the green chip is plasticized, sintered, and polished, and external electrodes are then formed thereon, thereby completing a multilayer ceramic capacitor.

The multilayer ceramic capacitor completed as described above is used in a state in which it is mounted on a wiring board. Nickel or tin plating is performed on surfaces of the external electrodes in order to easily mount the multilayer ceramic capacitor on the wiring board.

Particularly, in one method of manufacturing an electronic component, external electrodes are formed using copper (Cu), nickel (Ni) plating layers are formed on the external electrodes, and tin (Sn) plating layers are formed on the nickel plating layers. Here, the nickel plating layers are provided in order to prevent the copper configuring the external electrodes from being diffused to the tinplating layers and to increase heat resistance.

The nickel plating layers are generally formed through electroplating. In this case, a plating solution may permeate into the electronic component, or hydrogen gas may be generated when the plating is performed, and thus the reliability of the electronic component may be decreased. Therefore, in order to improve the reliability of the electronic component and simplify the process, the development of a method of manufacturing an electronic component in which plating is omitted is currently researched.

SUMMARY

An exemplary embodiment in the present disclosure may provide a ceramic electronic component in which reliability thereof may not be deteriorated even when formation of nickel plating layers is omitted and tin plating layers are directly formed on external electrodes, and a method of manufacturing the same.

According to an exemplary embodiment in the present disclosure, a ceramic electronic component comprises a ceramic body; internal electrodes disposed in the ceramic body; external electrodes disposed on outer surfaces of the ceramic body and electrically connected to the internal electrodes; and tin plating layers disposed on the external electrodes.

The external electrodes may comprise a conductive resin.

The conductive resin may contain a metal powder comprising at least one selected from the group consisting of nickel (Ni), aluminum (Al), copper (Cu), gold (Au), silver (Ag), tin (Sn), palladium (Pd), platinum (Pt), and an alloy thereof.

The tinplating layer and a metal powder contained in the conductive resin may be made of the same material.

The ceramic electronic component may further comprise metal layers disposed on the outer surfaces of the ceramic body on which the external electrodes are formed.

The metal layers may be disposed on regions in which the external electrodes are formed.

The metal layers may comprise at least one selected from the group consisting of nickel (Ni), aluminum (Al), copper (Cu), gold (Au), silver (Ag), tin (Sn), palladium (Pd), platinum (Pt), and an alloy thereof.

The internal electrodes may include first and second internal electrodes that are alternately stacked, and the external electrodes may include a first external electrode electrically connected to the first internal electrodes and a second external electrode electrically connected to the second internal electrodes.

According to another exemplary embodiment in the present disclosure, a method of manufacturing a ceramic electronic component comprises steps of: forming internal electrodes on dielectric sheets; stacking a plurality of the dielectric sheets to form a ceramic body; forming external electrodes on outer surfaces of the ceramic body; and forming tin plating layers on the external electrodes.

The method may further comprise, before the step of forming the external electrodes, a step of forming metal layers on the outer surfaces of the ceramic body.

The step of forming metal layers may include dipping the ceramic body in a conductive paste and then drying the ceramic body.

The step of forming the external electrodes may include mixing together a polymer resin and a metal powder to form a conductive resin paste for forming the external electrodes.

BRIEF DESCRIPTION OF DRAWINGS

The above and other aspects, features and advantages of the present disclosure will be more clearly understood from the following detailed description taken in conjunction with the accompanying drawings.

DETAILED DESCRIPTION

Figure 1:
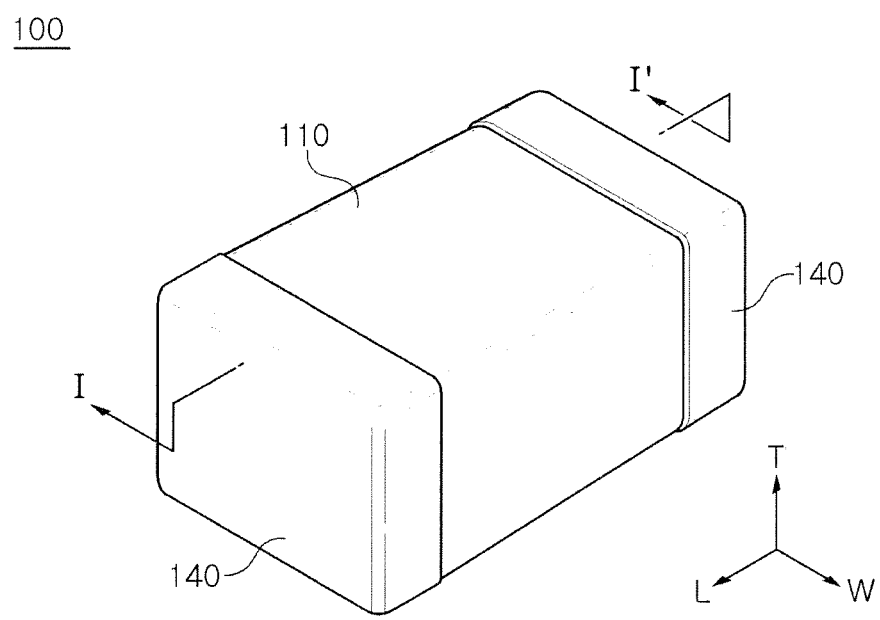
FIG. 1 is a perspective view of a ceramic electronic component according to an exemplary embodiment in the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 2:
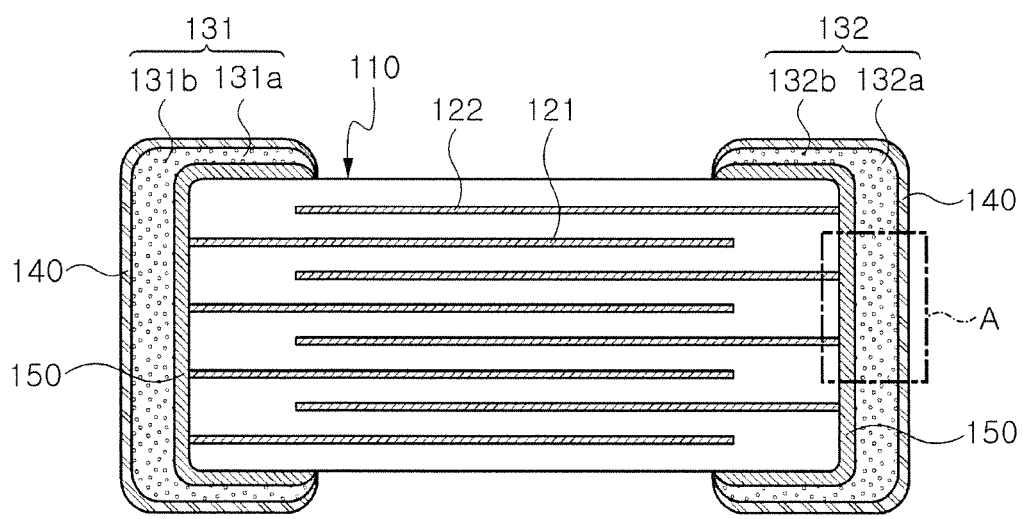
FIG. 2 is a cross-sectional view taken along line I-I' of FIG. 1.
Figure 3:
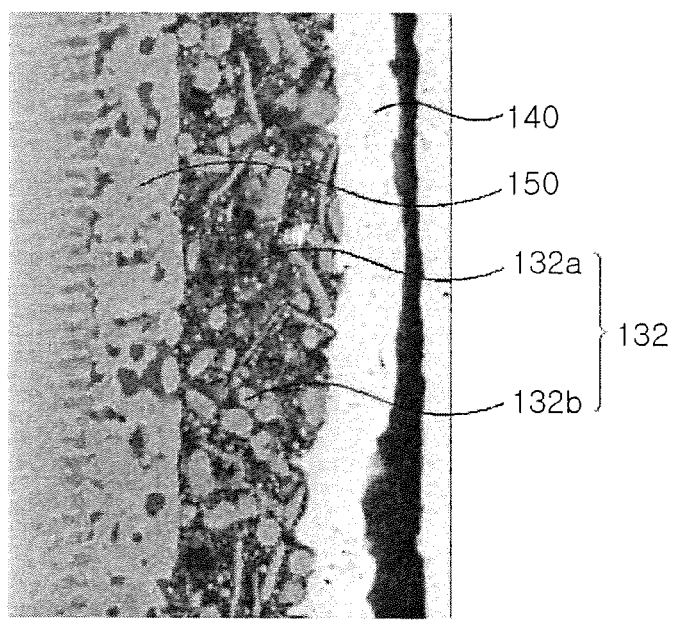
FIG. 3 is a photograph of region A of FIG. 2 captured by a scanning electron microscope (SEM).

FIG. 1 is a perspective view of a ceramic electronic component according to an exemplary embodiment. FIG. 2 is a cross-sectional view taken along line I-I' of FIG. 1. FIG. 3 is a photograph of region A of FIG. 2 captured by a scanning electron microscope (SEM).

Referring to FIGS. 1 through 3, a ceramic electronic component 100, according to an exemplary embodiment, may include a ceramic body 110, internal electrodes 121 and 122 stacked in the ceramic body 110, external electrodes 131 and 132 formed on outer surfaces of the ceramic body 110, and tin plating layers 140.

The ceramic body 110 may be formed by stacking a plurality of dielectric sheets formed of a high-k ceramic material, such as a barium titanate ($BaTiO_3$) based material, a lead composite perovskite based material, a strontium titanate ($SrTiO_3$) based material, or the like, and then sintering the plurality of dielectric sheets under a predetermined condition. Adjacent dielectric sheets may be integrated with each other so that boundaries therebetween are not readily apparent.

Here, when a direction in which the external electrodes 131 and 132 are formed is a "length direction" (L direction in FIG. 1), a direction in which the internal electrodes 121 and 122 are stacked is a "thickness direction" (T direction), and a direction perpendicular to the length and thickness directions is a "width direction" (W direction), the ceramic body 110 may have a rectangular parallelepiped shape of which a length is greater than a thickness and a width, and the thickness and the width are the same as each other, for example, a size such as 2012 (2.0 mm×1.2 mm×1.2 mm), 1005 (1.0 mm×0.5 mm×0.5 mm), 0603 (0.6 mm×0.3 mm×0.3 mm), 0402 (0.4 mm×0.2 mm×0.2 mm), or the like.

The internal electrodes 121 and 122 may be stacked with each of the dielectric sheets interposed therebetween, and may be formed of one or more selected from the group consisting of silver (Ag), palladium (Pd), aluminum (Al), nickel (Ni), titanium (Ti), gold (Au), copper (Cu), and platinum (Pt) having excellent electrical conductivity.

A function of the ceramic electronic component, according to an exemplary embodiment, may be changed depending on the shapes and connection structures of the internal electrodes 121 and 122. For example, if the internal electrodes 121 and 122 have a thin film shape, the ceramic electronic component, according to an exemplary embodiment, may serve as a capacitor in which capacitance is generated between the internal electrodes 121 and 122. Conversely, if the internal electrodes 121 and 122 have a spiral coil shape, the ceramic electronic component, according to an exemplary embodiment, may serve as an inductor. In addition, the ceramic electronic component, according to an exemplary embodiment, may be a piezoelectric element, a varistor, an electronic component resistor, a thermistor, or the like. Hereinafter, a multilayer ceramic capacitor will be described by way of example.

When the ceramic electronic component 100, according to an exemplary embodiment, serves as a capacitor, the internal electrodes 121 and 122 may be metal thin films that have a substantially rectangular plane shape, and may include first internal electrodes 121 and second internal electrodes 122 to which different electrical polarities are assigned.

Here, end portions of the first internal electrodes 121 and end portions of the second internal electrodes 122 may be alternately exposed to outer surfaces of the ceramic body 110, more specifically, end surfaces of the ceramic body 110 in the length direction. For example, the end portions of the first internal electrodes 121 may be exposed to a left end surface of the ceramic body 110, and the end portions of the second internal electrodes 122 may be exposed to a right end surface of the ceramic body 110.

The external electrodes 131 and 132 may be formed on the outer surfaces of the ceramic body 110 to which the internal electrodes 121 and 122 are exposed and may be electrically connected to the internal electrodes 121 and 122, respectively. Due to the above-mentioned connection structure, an external current may be applied to the internal electrodes 121 and 122 through the external electrodes 131 and 132.

Here, since the external electrodes 131 and 132 need to assign opposite electrical polarities to the first and second internal electrodes 121 and 122, respectively, the external electrodes 131 and 132 may include a first external electrode 131 electrically connected to the first internal electrodes 121 and a second external electrode 132 electrically connected to the second internal electrodes 122.

The first and second external electrodes 131 and 132 may be formed on the left and right end surfaces of the ceramic body 110, respectively. Therefore, the first external electrode 131 may be electrically connected to the first internal electrodes 121 exposed to the left end surface of the ceramic body 110 to assign a positive (+) or negative (−) polarity to the first internal electrodes 121, and the second external electrode 132 may be electrically connected to the second internal electrodes 122 exposed to the right end surface of the ceramic body 110 to assign an opposite polarity to the polarity assigned by the first external electrode 131 to the second internal electrodes 122.

Here, the external electrodes 131 and 132 may be formed of conductive resins in which metal powder particles 131b and 132b are dispersed in polymer resins 131a and 132a, respectively. Any one selected from the group consisting of nickel (Ni), aluminum (Al), copper (Cu), gold (Au), silver (Ag), tin (Sn), palladium (Pd), platinum (Pt), or an alloy thereof may be used as a material of the metal powder particles 131b and 132b. However, a material of the metal powder particles 131b and 132b is not necessarily limited thereto, but may be any material having conductivity.

In addition, a thermosetting epoxy based resin may be used as the polymer resins 131a and 132a. In addition to the thermosetting epoxy based resin, another kind of polymer, for example, a thermoplastic resin such as polyethylene (PE) acrylonitrile butadiene styrene (ABS), or polyamide (PA), may be used as the polymer resins 131a and 132a as long as it provides elasticity to the external electrodes 131 and 132. Here, a resin that does not change at a temperature of 300° C. or more may be used as the thermosetting resin in consideration of the fact that a reflow temperature at the time of mounting an element is approximately 300° C.

As described above, when the external electrodes 131 and 132 are formed of the conductive resin having elasticity, they may block vibrations due to a piezoelectric phenomenon of a dielectric from being transferred to a board to decrease acoustic noise. In addition, the external electrodes may protect the ceramic body from external impact applied at the time of firing or polishing the electronic component or at the time of mounting the electronic component on the board, thereby improving durability of the ceramic electronic component, for example, suppressing the generation of delamination or cracks.

The tinplating layers 140 may be plated and formed along outer surfaces of the external electrodes 131 and 132.

Since the external electrodes are generally soldered to lands of the board at the time when the electronic component is mounted on the board, the tin plating layers 140 may be provided in order to secure solderability and electrical connection. The reason the tin plating layers are provided is that a defect due to reflow soldering, flow soldering, or the like, does not easily occur in tin (Sn), which has much greater heat resistance than that of other metals.

In the related art, when tin is plated on the external electrodes formed of copper (Cu), an alloy such as $Cu_6Sn_5$, or the like, may be formed due to reactivity between the copper and the tin, which causes deterioration of the solderability. Therefore, in the related art, nickel was plated on the external electrodes before the tin was plated on the external electrodes in order to prevent the deterioration of the solderability. However, in the ceramic electronic component 100, according to an exemplary embodiment, because the external electrodes 131 and 132 formed of the conductive resin are used, formation of nickel plating layers may be omitted.

That is, because the conductive resin, a material of the external electrodes 131 and 132, has a form in which the metal powder particles 131b and 132b are dispersed in the polymer resins 131a and 132a, respectively, most of the tin plating layers 140 contacting the external electrodes 131 and 132 may contact the polymer resins 131a and 132a. As a result, formation of the alloy due to reactivity between two metals in the related art may be prevented.

Here, any metal having excellent electrical conductivity, as described above, may be used as a material of the metal powder particles 131b and 132b dispersed in the polymer resins 131a and 132a, respectively. In one embodiment, tin may be used as a material of the metal powder particles 131b and 132b in order to prevent diffusion of a metal different from tin to the tin plating layer 140.

Meanwhile, since end surfaces of the internal electrodes 121 and 122 externally exposed from the ceramic body 110 have a very small area, electrical connectivity between the internal electrodes 121 and 122 and the metal powder particles 131b and 132b may be problematic. In order to solve this problem, the ceramic electronic component, according to an exemplary embodiment, may further include metal layers 150 contacting the outer surfaces, that is, the left end surface and the right end surface of the ceramic body 110 on which the external electrodes 131 and 132 are formed to be directly connected to the end portions of the internal electrodes 121 and 122 externally exposed.

The metal layers 150 may be formed along regions in which the external electrodes 131 and 132 are formed. That is, because the external electrode 131 or 132 is formed on the left end surface (or the right end surface) of the ceramic body 110 and extends to four surfaces of the ceramic body 110 in the thickness direction and the width direction, the metal layer 150 may also be formed on the left end surface (or the right end surface) of the ceramic body 110 and may extend to the four surfaces of the ceramic body 110 adjacent to the left end surface (or the right end surface).

Because the metal layers 150 are formed in the structure as described above, a contact area with the metal powder particles 131b and 132b may be increased, and thus electrical connectivity may be secured. In addition, because the metal layers 150 cover both of the exposed surfaces of the internal electrodes 121 and 122, they may prevent permeation of a plating solution, and thus moisture resistance of the ceramic electronic component may be improved.

Next, a method of manufacturing a ceramic electronic component according to an exemplary embodiment will be described.

Figure 4:
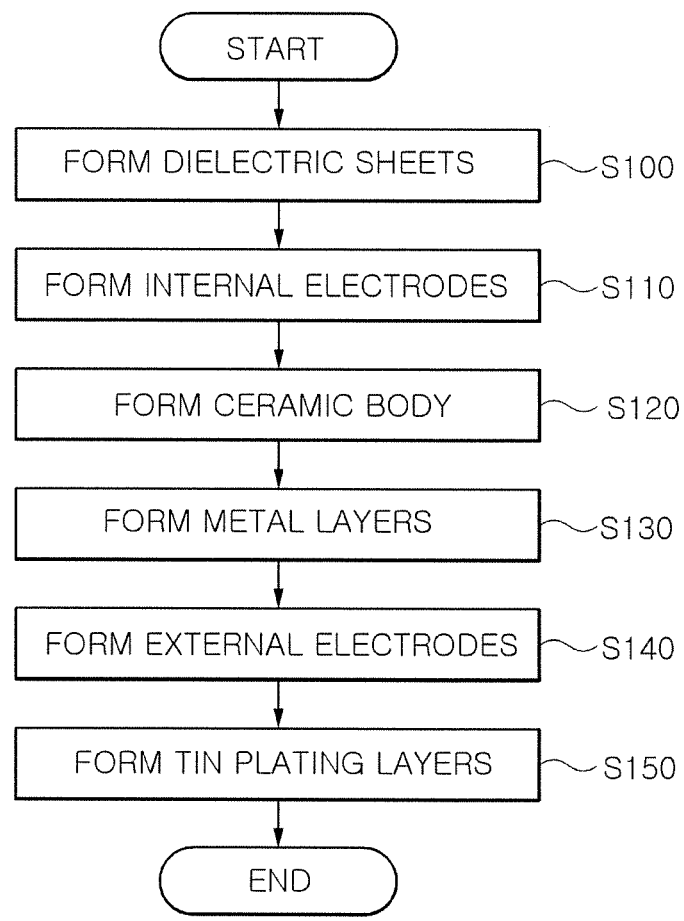
FIG. 4 is a flow chart sequentially illustrating a method of manufacturing a ceramic electronic component according to an exemplary embodiment in the present disclosure.

FIG. 4 is a flowchart sequentially illustrating a method of manufacturing a ceramic electronic component according to an exemplary embodiment.

Referring to FIG. 4, in order to manufacture the ceramic electronic component 100, according to an exemplary embodiment, dielectric sheets configuring the ceramic body 110 may first be manufactured (S100).

The dielectric sheets may be manufactured by mixing additives such as ethanol, binders, and the like, with high-k ceramic powders, such as barium titanate ($BaTiO_3$), or the like, ball-milling the mixtures to prepare ceramic slurry in which the ceramic powders are uniformly dispersed, applying the ceramic slurry on carrier films by a doctor blade method, drying the applied ceramic slurry, and then sintering the dried ceramic slurry.

An internal electrode paste containing metal powder particles and binders may be printed, plated, deposited, or sputtered on the dielectric sheets completed as described above to form the internal electrodes 121 and 122 (S110). Here, since a target electronic component to be manufactured is the multilayer ceramic capacitor, the internal electrodes 121 and 122 may have a thin film form.

Then, a laminate formed by stacking a plurality of dielectric sheets on which the internal electrodes 121 and 122 are formed may be isostatically pressed and may then be cut to prepare the ceramic body 110 having a predetermined size (S120).

Then, the ceramic body 110 may be dipped in a conductive paste and may then be dried to form the metal layers 150 on the outer surfaces of the ceramic body 110 (S130). As described above, the metal layers 150 may be formed by a dipping method without using a plating solution, thereby preventing deterioration of the ceramic electronic component due to permeation of a plating solution.

Next, the ceramic body 110 on which the metal layers 150 are formed may be sintered under a reducing atmosphere of a predetermined condition to co-fire the metal layers 150 and the first and second internal electrodes 121 and 122, and a conductive resin paste formed of tin-epoxy may be applied to the outer surfaces of the ceramic body 110 by a dipping method to cover the metal layers 150, thereby forming the external electrodes 131 and 132 (S140).

Here, various methods such as a painting method, a printing method, and the like, in addition to the dipping method may be used as a method of forming the external electrodes 131 and 132.

In addition, the tin-epoxy, a material of the conductive resin paste, is only an example. That is, any material prepared by mixing the metal powder particles 131*b* and 132*b* having excellent electrical conductivity with the polymer resins 131*a* and 132*a* having elasticity, such as PE, ABS, PA, or the like, may be used as a material of the conductive resin paste. However, tin may be used as a material of the metal powder particles 131*b* and 132*b* in order to prevent diffusion of a metal different from tin to the tin plating layer 140, as described above.

When the external electrodes 131 and 132 are formed, the tin plating layers 140 may be finally formed on the external electrodes 131 and 132 through electroplating, thereby completing the ceramic electronic component 100 according to an exemplary embodiment (S150).

As described above, the tin plating layers 140 may be directly formed on the external electrodes 131 and 132 without performing plating for forming nickel plating layers, and thus the time required for plating may be decreased. As a result, permeation of a plating solution into the ceramic electronic component may be prevented, and the reliability of the ceramic electronic component may be improved. In addition, since the plating for forming nickel plating layers is omitted, manufacturing costs may be reduced and yield may be improved.

As set forth above, according to exemplary embodiments in the present disclosure, the external electrodes formed of the conductive resin may be used to protect the ceramic body from external factors, and outer layers of the external electrodes may be formed using only the tin plating layers without forming nickel plating layers, and thus the time required for plating may be decreased. Therefore, permeation of a plating solution into the ceramic electronic component may be prevented to improve moisture resistance, and manufacturing costs of the ceramic electronic component may be reduced.

While exemplary embodiments have been shown and described above, it will be apparent to those skilled in the art that modifications and variations could be made without departing from the scope of the present inventive concept as defined by the appended claims.

What is claimed is:

1. A ceramic electronic component comprising: a ceramic body; internal electrodes disposed in the ceramic body; and external electrodes disposed on outer surfaces of the ceramic body and electrically connected to the internal electrodes, wherein the external electrodes comprise a conductive resin, wherein a nickel-free plating layer is disposed directly on the conductive resin, wherein the nickel-free plating layer and a metal powder contained in the conductive resin are made of the same material; and wherein the nickel-free plating layer is a tin plating layer.

2. The ceramic electronic component of claim 1, wherein the metal powder further comprises at least one selected from the group consisting of nickel (Ni), aluminum (Al), copper (Cu), gold (Au), silver (Ag), palladium (Pd), platinum (Pt), and an alloy thereof.

3. The ceramic electronic component of claim 1, further comprising metal layers disposed on the outer surfaces of the ceramic body on which the external electrodes are formed.

4. The ceramic electronic component of claim 3, wherein the metal layers are disposed on regions in which the external electrodes are formed.

5. The ceramic electronic component of claim 3, wherein the metal layers comprise at least one selected from the group consisting of nickel (Ni), aluminum (Al), copper (Cu), gold (Au), silver (Ag), tin (Sn), palladium (Pd), platinum (Pt), and an alloy thereof.

6. The ceramic electronic component of claim 1, wherein the internal electrodes include first and second internal electrodes that are alternately stacked, and the external electrodes include a first external electrode electrically connected to the first internal electrodes and a second external electrode electrically connected to the second internal electrodes.

7. A method of manufacturing a ceramic electronic component, comprising steps of: forming internal electrodes on dielectric sheets; stacking a plurality of the dielectric sheets to form a ceramic body; and forming external electrodes on outer surfaces of the ceramic body, wherein the external electrodes comprise a conductive resin, and wherein a nickel-free plating layer is disposed directly on the conductive resin, wherein the nickel-free plating layer and a metal powder contained in the conductive resin are made of the same material; and wherein the nickel-free plating layer is a tin plating layer.

8. The method of claim 7, further comprising, before the step of forming the external electrodes, a step of forming metal layers on the outer surfaces of the ceramic body.

9. The method of claim 8, wherein the step of forming metal layers includes dipping the ceramic body in a conductive paste and then drying the ceramic body.

10. The method of claim 7, wherein the step of forming the external electrodes includes mixing together a polymer resin and the metal powder to form the conductive resin paste for forming the external electrodes.

* * * * *